US012060797B2

(12) United States Patent
Schwendenmann et al.

(10) Patent No.: US 12,060,797 B2
(45) Date of Patent: Aug. 13, 2024

(54) CARBON FACE SEAL

(71) Applicant: Raytheon Technologies Corporation, Farmington, CT (US)

(72) Inventors: Andrew V. Schwendenmann, Hampden, MA (US); Jacob Peter Mastro, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/581,018

(22) Filed: Jan. 21, 2022

(65) Prior Publication Data
US 2023/0235678 A1 Jul. 27, 2023

(51) Int. Cl.
| F01D 25/18 | (2006.01) |
| F01D 11/00 | (2006.01) |
| F02C 7/28 | (2006.01) |
| F16J 15/34 | (2006.01) |

(52) U.S. Cl.
CPC .......... *F01D 11/003* (2013.01); *F01D 25/183* (2013.01); *F02C 7/28* (2013.01); *F16J 15/3496* (2013.01); *F05D 2300/224* (2013.01)

(58) Field of Classification Search
CPC ........ F01D 11/003; F01D 25/183; F02C 7/28; F05D 2300/224; F16J 15/34; F16J 15/3496; F16J 15/3436; F16J 15/3452
See application file for complete search history.

(56) References Cited

U.S. PATENT DOCUMENTS

| 3,419,363 A | 12/1968 | Sliney |
| 3,647,227 A | 3/1972 | Lojkutz et al. |
| 3,758,179 A | 9/1973 | Smith |
| 3,948,533 A | 4/1976 | Novosad |
| 4,688,807 A | 8/1987 | Warner |
| 4,728,448 A | 3/1988 | Sliney |
| 4,746,268 A | 5/1988 | Sugimoto et al. |
| 5,174,584 A * | 12/1992 | Lahrman ............... F01D 11/003 277/400 |
| 5,217,232 A | 6/1993 | Makhobey |
| 6,007,069 A | 12/1999 | Sadowski |
| 9,995,397 B2 | 6/2018 | Miller |

(Continued)

FOREIGN PATENT DOCUMENTS

GB 2453231 A 4/2009

OTHER PUBLICATIONS

European Search Report dated Jun. 12, 2023 for European Patent Application No. 23152959.5.

*Primary Examiner* — Gilbert Y Lee

(74) *Attorney, Agent, or Firm* — Bachman & LaPointe, P.C.

(57) ABSTRACT

An apparatus has: a first member; a shaft rotatable relative to the first member about an axis; and a seal system. The seal system has a seal carrier having: an axially-extending wall having an inner diameter (ID) surface; and a radially-extending wall having a first surface. A seal is carried by the first member and has: an outer diameter (OD) surface; and a seal face. A seat is carried by the shaft and has a seat face in sliding sealing engagement with the seal face. One or more springs bias the seal carrier relative to the first member so as to bias the seal face against the seat face. At least one of the seal carrier inner diameter (ID) surface and seal outer diameter (OD) surface is formed by a coating.

22 Claims, 4 Drawing Sheets

(56) References Cited

U.S. PATENT DOCUMENTS

| | | |
|---|---|---|
| 10,385,713 B2 | 8/2019 | Walker et al. |
| 2004/0201176 A1* | 10/2004 | Bjornson ............ F16J 15/3488 |
| | | 277/370 |
| 2008/0308425 A1* | 12/2008 | Mittendorf ............ C23C 18/32 |
| | | 427/127 |
| 2014/0091535 A1* | 4/2014 | Cusack ................ F01D 11/003 |
| | | 277/641 |
| 2019/0154156 A1 | 5/2019 | Sakakura et al. |
| 2020/0166140 A1 | 5/2020 | Richie et al. |
| 2021/0254719 A1 | 8/2021 | Stoyanov et al. |
| 2021/0332889 A1 | 10/2021 | Nasman et al. |

\* cited by examiner

CARBON FACE SEAL

BACKGROUND

The disclosure relates to gas turbine engines. More particularly, the disclosure relates to carbon seal systems.

Carbon seals are commonly used to seal between relatively rotating components in gas turbine engines (used in propulsion and power applications and broadly inclusive of turbojets, turboprops, turbofans, turboshafts, industrial gas turbines, and the like). These include shaft seals (i.e., where the sealing surfaces of seal and seat face radially (e.g., within 1.0° or essentially 0°) and extend axially) and face seals (i.e., where the sealing surfaces face axially (e.g., within 1.0° or essentially 0°) and extend radially).

In typical face seal situations, the annular carbon seal is axially spring biased into engagement with an annular seat (typically metallic such as a steel). Typical bias springs are bellows springs, coil springs (multiple circumferentially-distributed springs), or wave springs. The spring(s) act axially between a seal housing (seal support) and a seal carrier (carbon carrier) carrying the seal. An example seal carrier is a full annulus metal component carrying the seal and intervening between the seal and the spring. For example, a carrier may have: an outer sidewall surrounding a portion of the seal in interference fit; and a radial flange engaged by the spring (e.g., to which a bellows spring is welded). The seal may be in a radial interference fit (e.g., thermal interference fit) with the carrier outer sidewall. The sprung mass of such a seal includes the mass of the carbon ring, the carrier, and effectively half of the spring(s).

The seal may be a single-piece full annulus carbon member or may be segmented (formed by an end-to-end circumferential array of segments in arch bound relation via the carrier interference fit). For either type, the interference fit is advantageously tight enough, in view of the coefficient of friction between the seal and carrier, to maintain the seal seated in the carrier so that the seal does not shift circumferentially or axially (local or overall) relative to the carrier. An example static coefficient of friction between the carbon of the seal and the steel or other metallic substrate is ≤0.2, often much less. Alternative proposed seals use an adhesive film (e.g., epoxy) to reduce or eliminate the required interference fit. At the macroscale retaining the seal seated in the carrier is important because if the seal rotates or moves axially it can break or liberate resulting in seal failure. On a microscale if the retention method does not retain the seal it can move after assembly so that the flatness of the sealing face no longer meets the strict requirements, thereby making the seal ineffective.

Often, the carbon seal is on non-rotating static structure and the seat rotates with one of the engine shafts. The sliding engagement causes frictional heating. The heat must be dissipated. With a rotating seat, it is common to use oil cooling. Generally, oil cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both wet face and dry face seals, the oil may be delivered through a nozzle and slung radially outward by the rotating component and collected in a radially outwardly closed and inwardly open collection channel from which the passageways extend further radially outward.

SUMMARY

One aspect of the disclosure involves an apparatus comprising: a first member; a shaft rotatable relative to the first member about an axis; and a seal system. The seal system has: a seal carried by the first member and having a seal face and an outer diameter (OD) surface; a seal carrier; a seat carried by the shaft and having a seat face in sliding sealing engagement with the seal face; and one or more springs biasing the seal carrier relative to the first member so as to bias the seal face against the seat face. The seal carrier has: an axially-extending wall having an inner diameter (ID) surface; and a radially-extending wall having a first surface. At least one of the seal carrier inner diameter (ID) surface and seal outer diameter (OD) surface is formed by a coating on a substrate of said at least one.

In a further embodiment of any of the foregoing embodiments, additionally and/or alternatively, the radial interference fit provides a compressive stress in the seal of 10 MPa to 150 MPa.

In a further embodiment of any of the foregoing embodiments, additionally and/or alternatively, the coating increases a static coefficient of friction between the seal and the seal carrier.

In a further embodiment of any of the foregoing embodiments, additionally and/or alternatively, the coating is metallic.

In a further embodiment of any of the foregoing embodiments, additionally and/or alternatively, the coating comprises at least 30% by weight nickel.

In a further embodiment of any of the foregoing embodiments, additionally and/or alternatively, the seal carrier inner diameter (ID) surface is formed by a steel or iron-nickel alloy body of the seal carrier.

In a further embodiment of any of the foregoing embodiments, additionally and/or alternatively, the coating comprises at least 50% by weight silver.

In a further embodiment of any of the foregoing embodiments, additionally and/or alternatively, the seal carrier inner diameter (ID) surface is formed by a steel or iron-nickel alloy body of the seal carrier.

In a further embodiment of any of the foregoing embodiments, additionally and/or alternatively, the coating has a thickness of 2.5 micrometers to 200 micrometers.

In a further embodiment of any of the foregoing embodiments, additionally and/or alternatively, the coating has an outer friction layer and an inner strike layer wherein a largest by weight elemental component of the outer friction layer is different from a largest by weight elemental component of the inner layer.

In a further embodiment of any of the foregoing embodiments, additionally and/or alternatively, the coating has an outer friction layer and an inner strike layer wherein a largest by weight elemental component of the outer friction layer is sliver or nickel and a largest by weight elemental component of the inner strike layer is copper.

In a further embodiment of any of the foregoing embodiments, additionally and/or alternatively, the seal carrier inner diameter (ID) surface is formed by a steel or iron-nickel alloy body of the seal carrier.

In a further embodiment of any of the foregoing embodiments, additionally and/or alternatively, the seal carrier inner diameter (ID) surface is formed by a coating on a substrate of the seal carrier.

In a further embodiment of any of the foregoing embodiments, additionally and/or alternatively, the coating on the substrate of the seal carrier is a metal or an alloy of the same base as a base of a metal or an alloy forming the coating on the substrate of the seal.

In a further embodiment of any of the foregoing embodiments, additionally and/or alternatively, the base of the coating on the seal substrate and the base of the coating on the seal carrier substrate are both silver.

In a further embodiment of any of the foregoing embodiments, additionally and/or alternatively, the seal carrier substrate comprises a steel or iron-nickel alloy.

In a further embodiment of any of the foregoing embodiments, additionally and/or alternatively, the seal is a carbon seal.

In a further embodiment of any of the foregoing embodiments, additionally and/or alternatively, the seat is steel.

In a further embodiment of any of the foregoing embodiments, additionally and/or alternatively, the seal substrate is a single piece.

In a further embodiment of any of the foregoing embodiments, additionally and/or alternatively, the apparatus is a gas turbine engine.

In a further embodiment of any of the foregoing embodiments, additionally and/or alternatively, a method for manufacturing the apparatus comprises: applying the coating to the substrate; and thermal interference fitting the seal to the carrier.

In a further embodiment of any of the foregoing embodiments, additionally and/or alternatively, the applying comprises plasma spray.

In a further embodiment of any of the foregoing embodiments, additionally and/or alternatively, the thermal interference fitting comprises: heating the seal carrier to a temperature of 90° C. to 250° C.; and inserting the seal into the heated seal carrier.

In a further embodiment of any of the foregoing embodiments, additionally and/or alternatively, cooling of the seal carrier leaves a radial interference fit with a compressive stress in the seal of 10 MPa to 150 MPa.

In a further embodiment of any of the foregoing embodiments, additionally and/or alternatively, the method further comprises grinding of the applied coating.

Another aspect of the disclosure involves an apparatus comprising: a first member; a shaft rotatable relative to the first member about an axis; and a seal system. The seal system comprises a seal carrier having: an axially-extending wall having an inner diameter (ID) surface; and a radially-extending wall having a first surface. A seal is carried by the seal carrier in a radial interference fit with the seal carrier axially-extending wall ID surface and has: an outer diameter (OD) surface; and a seal face. A seat is carried by the shaft and has a seat face in sliding sealing engagement with the seal face. One or more springs bias the seal carrier relative to the first member so as to bias the seal face against the seat face. The seal system further includes means for increasing a static coefficient of friction between the seal and the seal carrier. The means may comprise one or more coatings. The one or more coatings may be according to the foregoing embodiments.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
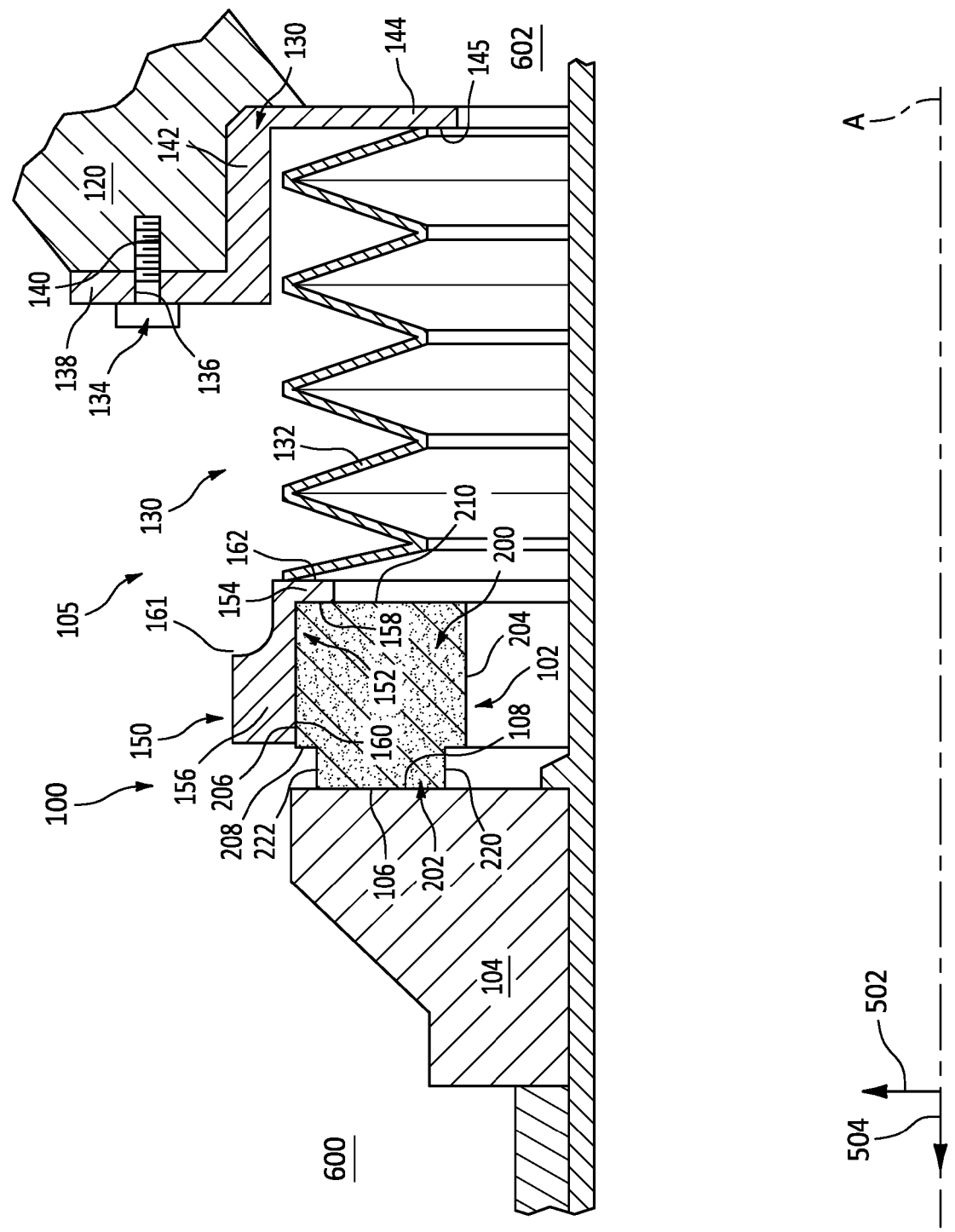
FIG. 1 is an axial sectional view of a first seal system in a turbomachine.

All things being equal, at a given level of interference fit contact pressure between the seal and the carrier increasing the coefficient of friction between the seal and the carrier will increase resistance to seal displacement. Thus, for example, increased coefficient of friction may be used to provide better seal retention or maintain seal retention while reducing contact pressure. Reduced contact pressure may allow lightening of the seal and/or carrier while keeping seal compressive stresses and carrier tensile stresses within material capabilities.

Due to carbon lubricity, the material pairing of the seal carbon material and the metallic carrier will have a relatively low static coefficient of friction $\mu$ (e.g., ≤0.20, often much less). Accordingly, a coating (friction coating) on the seal carbon material intervening between the carbon material and the carrier may increase the static coefficient of friction (e.g., to ≥0.30 or ≥0.50 or an example 0.60 to 1.5).

Discussed further below, example coatings are metallic resulting in a metal-on-metal pairing having a higher static coefficient of friction than the pairing of the carbon material and carrier material.

Example metallic coating materials include silver, nickel, aluminum, and copper (including their respective alloys and mutual alloys) and steels. Example coating application techniques include spray and physical vapor deposition. In optional multi-layer coatings, the outer layer of the layer stack may be such a material acting as a friction coating; whereas other layer(s) may be for bonding or other purposes.

One particular area of candidate materials are nickel alloys commonly used for thermal spray repairs (of steel or other alloys) in applications such as shafts, bearing journals, and the like. One example of such a nickel alloy is a nickel-aluminum alloy such as used in wire spray. Example by weight aluminum content is 3.0% to 7.0% with nickel being substantially the balance plus impurities and minor alloying elements (if any). Example impurities and minor alloying elements are less than 2.0 weight percent total.

Another particular area of candidate materials are silver or silver alloys commonly used for lubricity in applications such as coating the steel cages of ball bearings and the like. Even though such alloys are typically used for lubricity, they increase the static friction coefficient from that provided by the carbon material. They also offer a particularly increased/favorable static coefficient of friction when coating both seal and carrier. This reflects the particular low relative lubricity of silver on silver (or, more broadly of silver or silver-base alloys with each other or itself). One example of essentially pure silver is AMS 2412. More broadly, a relatively pure silver may be at least 95.0 weight percent silver or at least 99.0 weight percent. The purity limits melting point depression to maintain desirable service temperatures. Particularly when lower service temperatures are involved, alloys with lower silver levels may be used. One group of such alloys are existing braze alloys (e.g., Ag—Cu—Ni alloys). One example of such a silver alloy is AMS 4765, a silver braze alloy of nominal by weight percent composition Ag56, Cu42, Ni2. Thus, example silver alloys are at least 50% silver by weight.

Thus, in one group of examples, the mating surface of the carrier is uncoated substrate material. However, other embodiments may include a coating on the mating surface of the carrier. Such carrier coatings may further increase the static coefficient of friction and/or provide anti-corrosion or other benefit FIG. 1 shows a seal system 100 having a sealing element (seal) 102 and a seat 104 (seal plate). As is discussed further below, the seal system is used in a turbomachine such as a gas turbine engine for a purpose such as isolating a bearing compartment 600. The seal is mounted to a first structure such as an engine static structure and the seat is mounted to rotate relative thereto (e.g., mounted to a shaft) about an axis A which may be the engine centerline or central longitudinal axis. As discussed below, the example seal system includes the seat 104 as one piece and the seal 102 as part of a cartridge subassembly (cartridge) 105. FIG. 1 further shows an outward radial direction 502 and a forward direction 504.

The example seal 102 is a carbon seal (carbon element) having an axially-facing/radially-extending seal surface or face 106. The example seal 102 is formed as single-piece body circumscribing a central axis normally coincident with the centerline A when installed.

The seat 104 has an axially-facing/radially-extending seat surface or face 108 engaging the seal face 106. This engagement may allow relative radial displacement of seal and seat.

The seal system 100 (FIG. 1) isolates a space or volume 600 from a space or volume 602. The example space or volume 600 is a bearing compartment. The example seal system is at an aft end of the bearing compartment. A similar or other seal system (not shown) may be at a forward end of the bearing compartment (e.g., oppositely oriented). The example bearing compartment 600 contains a bearing supporting the shaft for rotation relative to the static structure about the axis A. The example second space or volume 602 is a buffer air chamber.

Figure 5:
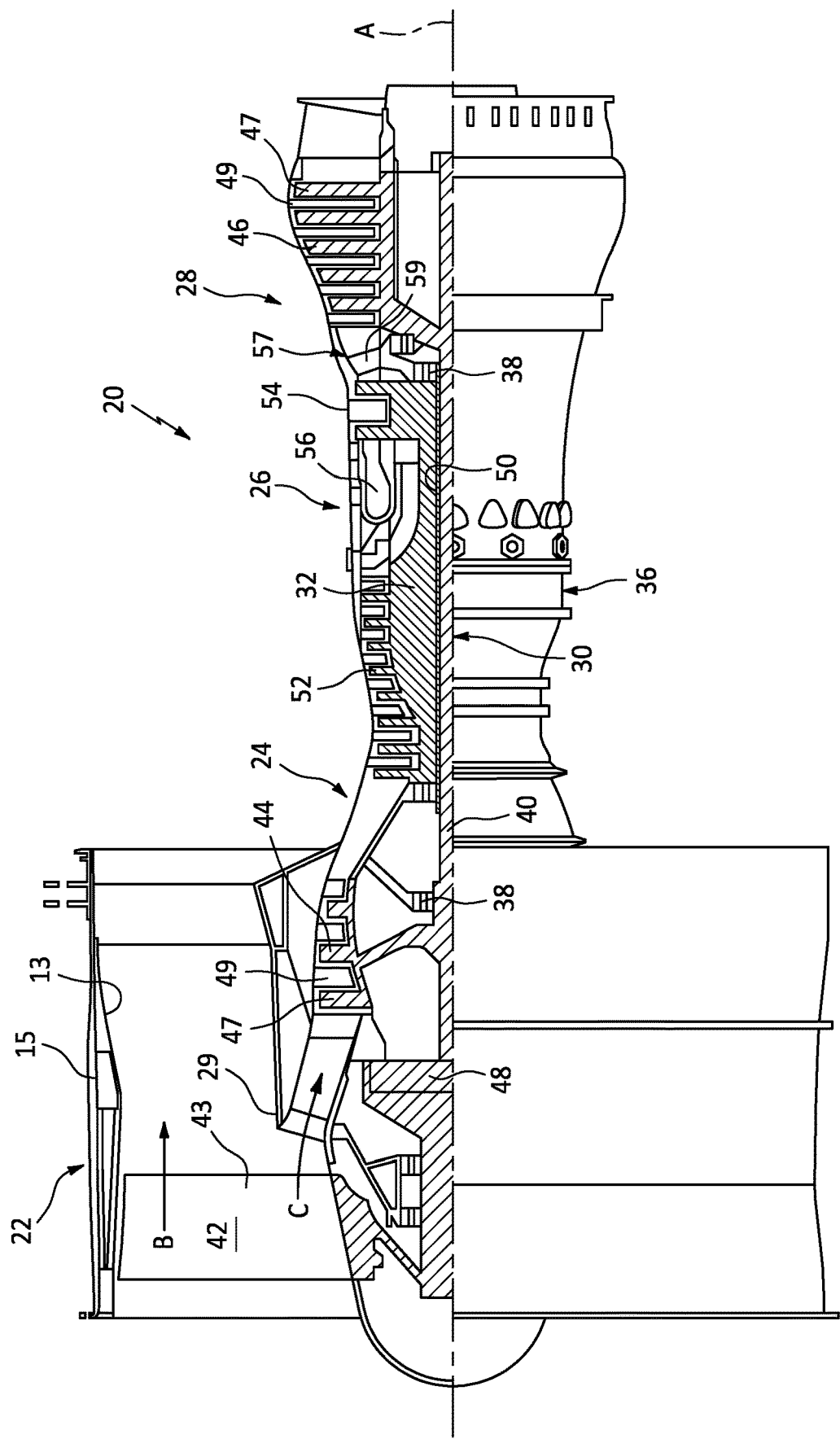
FIG. 5 is a schematic view of a gas turbine engine in which the seal systems may be included.

In the example engine configuration and position, a case component 120 (e.g., a strut ring/frame) of the static structure is positioned radially inboard of a gas path (core flowpath) C (FIG. 5). An example seal system is an oil-cooled dry-face seal system wherein an array of passageways (not shown) extend through the seat from respective inlet ports (not shown) at a plenum (between the seat and a portion of a shaft) through outlet ports (not shown) on the seat to an outer diameter (OD) rim for carrying oil. An alternative is a dry face uncooled seal system. The seal system may alternatively be a wet face seal system in that there are oil passageways to outlets on the seat face 108.

The seal system 100 cartridge 105 further includes a seal housing (seal support) 130 and one or more bias springs 132 (e.g., a bellows spring or an array of coil springs) biasing the seal 102 into engagement with the seat 104 in the assembled engine. The seal housing 130 is mounted to the case component 120 such as via interference fit and/or fasteners. Example fasteners 134 (FIG. 1) are screws extending through apertures 136 in mounting ears or a radial flange 138 of the housing and then into threaded bores 140 of the case component 120 (or through the case component to engage nuts (not shown)). The example seal housing 130 is machined or cast/machined of an alloy. The example mounting ears or flange 138 protrudes from one end of a sidewall 142 of the seal housing 130. An end wall 144 extends radially inward from the opposite end of the sidewall 142. The adjacent end(s) of the spring(s) 132 contact the interior radial face 145 of the end wall 144. For a bellows spring 132, the spring end may be welded, brazed, or otherwise secured to the face 145. For coil springs, coil spring (not shown) ends may be captured in bores in the face 145 or may capture projections from the face 145.

FIG. 1 further shows the cartridge 105 as including a seal carrier (carbon carrier) 150 intervening between the seal 102 and the spring(s) 132. For forming a compartment (seal compartment) 152 for receiving the seal 102, the seal carrier has a radial wall 154 and an axial wall 156 extending axially from the radial wall 154. The radial wall 154 has, along the seal compartment 152, a face 158 (an aft face of the seal compartment and forward face of the wall in the example or a forward face of the seal compartment and aft face of the wall if oppositely oriented). The axial wall 156 has, along the seal compartment, a face 160 (an inner diameter (ID) face). The example seal carrier 150 is machined or cast/machined of an alloy. In the example, the radial wall 154 has a face 162 axially opposite the face 158. The example adjacent bellows spring end may be welded, brazed, or otherwise secured to the face 162. In the example embodiment, the bellows spring 132 restricts rotation of the seal carrier 150 about the engine centerline A but also provides a relatively robust centering force. In alternative embodiments, additional anti-rotation and/or centering means may be provided. For example, when using an array of compression coil springs instead of the bellows spring the seal system may need such means. Example such means are one or more anti-rotation pins fixed relative to case structure received in holes in ears and/or a flange of the seal carrier to restrict rotation and limit radial excursions. Additionally, in various implementations, there may be secondary seals including labyrinth seals, C-seals, and the like.

FIG. 1 shows the seal 102 as having a main body section 200 and a nose 202 protruding axially therefrom to the seal surface 106. The main body 200 has an inner diameter (ID) surface 204 and an outer diameter (OD) surface 206. The main body has a first end face 208 (forward in the example) and a second end face 210 (aft in the example). The second end face 210 contacts the face 158. The surface 206 contacts the seal carrier axial wall ID surface 160. The nose 202 has an inner diameter (ID) surface 220 and an outer diameter (OD) surface 222 respectively radially recessed relative to the surfaces 204 and 206.

The example seal 102 comprises a carbon-based substrate 240 (FIG. 1A) and a coating (coating system) (a single layer 242 in the example). Substrate surfaces form corresponding surfaces of the example seal with the coating outer surface forming the OD surface 206 (or section/portion thereof) atop a corresponding OD surface section 207 of the substrate.

The example seal system may represent a modification or reengineering of a baseline seal or configuration thereof (lacking the coating). The baseline may have a tight interference fit (e.g., press-fit and/or thermal interference fit) between the carbon seal and the seal carrier with direct seal carbon to carrier alloy contact. The tight interference fit may itself provide robust sealing between the seal and carrier. The modified or reengineered seal system or configuration may involve a lighter interference fit in some embodiments.

Figure 1A:
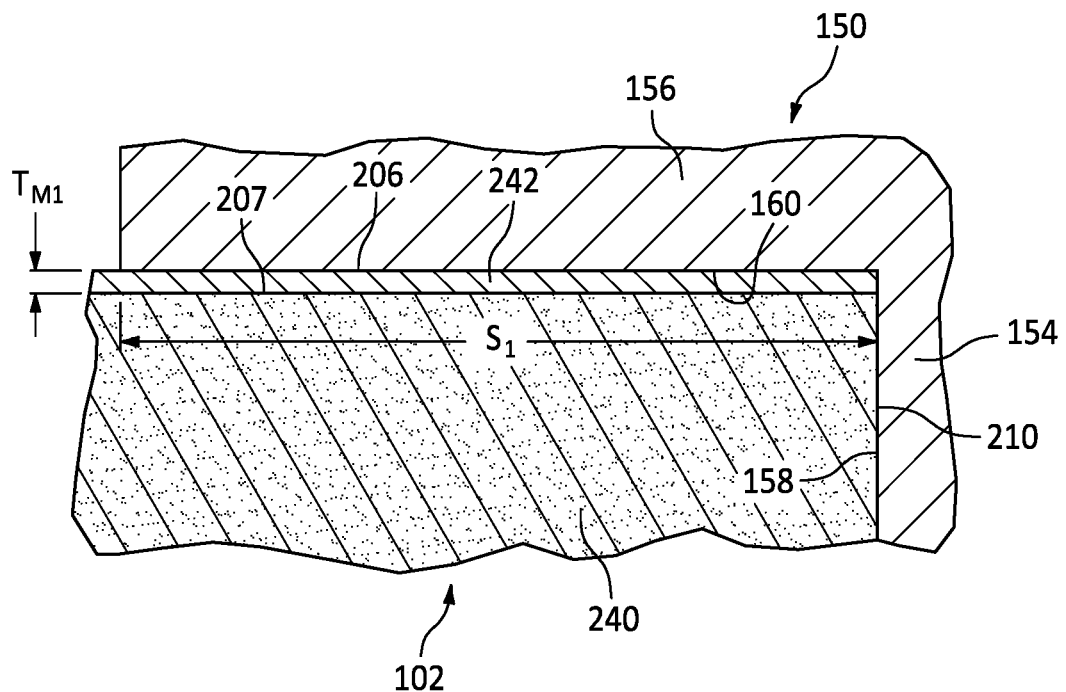
FIG. 1A is an enlarged view of the seal system of FIG. 1.

FIG. 1A further shows the coating 242 as having a thickness $T_{M1}$ over a span of overlap $S_1$ of the coating 242 with the carrier ID surface 160. In the illustrated example, the span of overlap extends to the faces 158 and 210. However, in other embodiments, there may be an OD bevel to the substrate or other reduction in the span. An example thickness $T_{M1}$ is 1.0 micrometer to 100 micrometers over a span $S_1$ of at least an example 5.0 millimeters (e.g., an average thickness over that span of contact). The particular span will depend on seal size with upper limits being in about 75 millimeters for larger seals in gas turbine engines. More particularly, example $T_{M1}$ is 10 micrometers to 100 micrometers (or 20 micrometers to 100 micrometers or 20 micrometers to 75 micrometers over a span $S_1$ of 10.0 millimeters to 50 millimeters. As noted above, the material pairing of the coating 242 surface 206 against the carrier 150 ID surface 160 provides a static coefficient of friction greater than that otherwise offered between the substrate OD surface 207 and carrier ID surface 160. The coating may axially extend over at least the entire contact span of seal and carrier.

In one example of a manufacture process, the seal substrate and the carrier are made by conventional processes (e.g., the processes of a baseline being modified). For example, the seal substrate may be made via machining of a carbon blank and the seal carrier may likewise be machined from billet or other stock or cast and machined. The example coating 242 may be applied after masking (e.g., via covering by hard fixutring/tooling) portions of seal substrate 240 surfaces adjacent the OD surface 207 (and potentially portions of the OD surface 207).

The coating 242 may be applied via spray. This may be applied by placing the seal on a mandrel and rotating the mandrel while spraying and continuously or incrementally axially traversing the spray gun. In some implementations, the mandrel may serve a dual purpose of mandrel and tooling/mask. This rotation/traversing may be repeated for multiple passes with offsets or other steps to limit surface variation. After spraying, the OD surface 206 may optionally be machined to tolerance such as via turning, abrasive grinding (e.g., with an abrasive wheel), or other machining. If an applied mask was used (e.g., a coating, pre-formed tape or film, or the like) demasking (e.g., solvent cleaning) may follow.

In an example of a nickel or nickel alloy coating 242, the coating is applied via a thermal spray process such as air plasma spray. An initial as-sprayed coating thickness may be in an example range of 25 micrometers to 250 micrometers but is subsequently ground down to a more precise thickness and texture with an example post-grinding thickness in the range of 20 micrometers to 200 micrometers, more particularly 20 micrometers to 100 micrometers or 20 micrometers to 75 micrometers.

Alternate variations may avoid a post-spray machining (e.g., grinding). In such examples, the as-sprayed thickness may be less such as in the range of 1.2 micrometers to 25 micrometers. Variations in the thinner coating may have less influence on variations in the interference fit than would variations in a thicker coating. Thus, the thicker coating may be machined to provide a particular tolerance without necessarily becoming thin.

Figure 2:
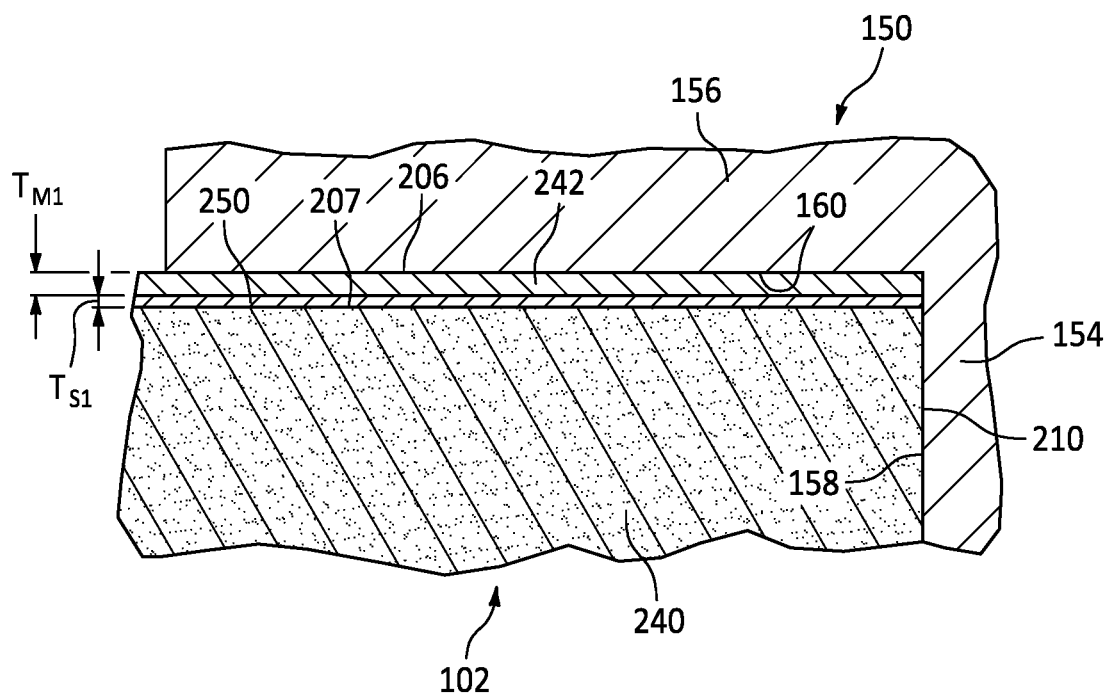
FIG. 2 is an enlarged axial sectional view of a second seal system.

In further variations on the ground coating or unground coating, the application of the nickel coating layer 242 may be preceded by applying a strike/flash layer 250 (FIG. 2) such as a copper strike. An example copper strike/flash is applied to a thickness $T_{S1}$ of about 1.0 micrometers to 4.0 micrometers. Thus, in most implementations, the strike/flash may be thinner than the nickel alloy. But in some implementations, the strike/flash may be thicker than the nickel alloy. The strike/flash layer serves to improve bonding with the carbon. Example application is by electroplate or cold spray.

An example static coefficient friction between the nickel coating 242 and the steel of the seal carrier is 0.60 or greater at ambient conditions (e.g., temperature in the range of 18° C. to 21° C.).

In one example of an assembly process, the seal carrier 150 is preheated (e.g., by thermal convection in either an air oven or a liquid (e.g., water) bath). Example heating in an existing baseline range is to a temperature in the range of 280° C. to 340° C. Example heating for a reduced temperature range for reduced stress is to a temperature of about 120° C., more broadly, 90° C. to 150° C. or 90° C. to 200° C. or 90° C. to 250° C.

The seal 102 may be inserted to the seal carrier via translation (e.g., held by a tool (not shown)). The seal may then be held in its fully seated condition while the carrier is allowed to cool (e.g., in ambient or forced air) to a threshold temperature (e.g., by at least 50% of the peak temperature difference or at least 80%). Thereafter, it may be released from the tool for any further cooling and subsequent assembly to additional components. Depending on configuration, prior to assembling the seal to the seal carrier the seal carrier may be assembled to the bellows spring.

In one example of reengineering from a baseline seal system, an interference fit of the baseline seal is replaced by a lighter interference fit plus the friction increase from the coating. Seal construction may otherwise be preserved. This interference reduction may be achieved by a slight increase in the diameter of the seal carrier ID surface or by a slight decrease in the diameter of the seal OD surface to at least partially offset the coating thickness. In some embodiments, the reduced tensile hoop stresses in the carrier enable the use of lower strength carrier materials that may have more favorable characteristics for seal performance such as lower coefficients of thermal expansion that more closely match that of the seal carbon. For example, an iron-nickel alloy such as ASTM F30 (e.g., Alloy 42 or UNS N94100), may replace a steel (e.g., 17-4PH/AMS 5643 stainless steel). Additionally, the lower stresses in the carbon and carrier may enable cross-sectional geometries that may be more favorable to seal performance but would otherwise not have sufficient structural strength to be acceptable.

However, further advantages may be achieved and may have a cumulative effect and any particular embodiment may involve tradeoffs among the possible advantages. For example, the reduced interference fit reduces stresses in the seal. This may allow a reduction in the cross-sectional area of the seal due to not having to withstand the stresses at a given level of interference. This cross-sectional reduction reduces the weight of the seal.

For thermal interference fits, reduced interference may reduce the heating temperature and thus decrease cycle time and energy used in heating. Similarly, reduced interference may be associated with reduced need for robustness of the seal carrier, allowing material removal from the seal carrier and, thereby, lightening of the seal carrier. Lightening of the seal carrier may have positive feedback by further reducing energy and cycle time for heating in the thermal interference fit.

Lightening of the seal and/or seal carrier and/or sealing ring also allows reduction in the needed bias force from the bias spring(s). This reduced bias force may be associated with reduced spring weight. However, the reduced biased force may have a number of other advantages. Reduced bias force will, all things being equal, reduce seal wear and heat generation. This may improve longevity.

As an example of temperature reduction for thermal interference fit, the baseline seal may use a heating temperature in the range of 280° C. to 340° C.; whereas the revised seal may use 90° C. to 150° C. or other ranges discussed above. The reduction may be of an example 190° C. to 220° C. or 100° C. to 220° C.

As an example of interference and stress reduction, the baseline seal may have an example compressive stress (e.g., at ambient conditions of 21° C. and 1.0 atm (1.0 Bar), more broadly 18° C. to 25° C. at 0.95 Bar to 1.05 Bar) of 18,500 psi (128 MPa), more broadly at least 75 MPa or 75 MPa to 150 MPa; whereas the revised seal may have an example such a stress of 5,735 psi (39.5 MPa), more broadly at least 10 MPa or 10 MPa to 60 MPa or 20 MPa to 50 MPa. The reduction may be of an example at least 10 MPa, if present.

Additionally, in some embodiments the reduced interference may allow reduced tolerance requirements.

Figure 3:
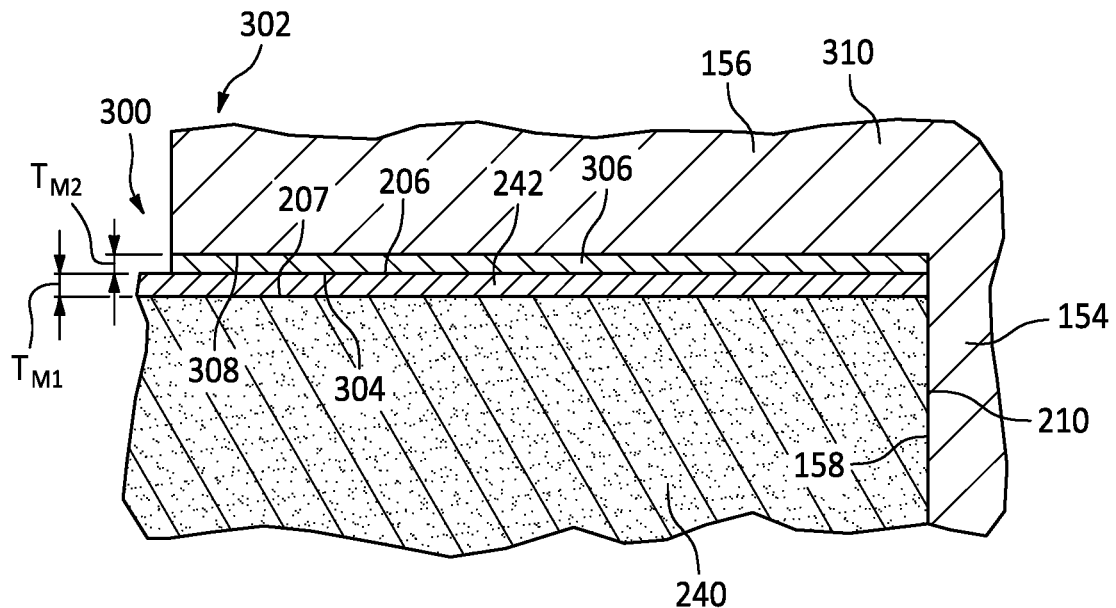
FIG. 3 is an enlarged axial sectional view of a third seal system.

FIG. 3 shows an alternate seal cartridge 300 wherein the carrier 302 differs by having its ID surface 304 formed by the surface of a coating layer 306 atop an inner diameter surface 308 of a metallic substrate 310. In this example, both coatings 242 and 306 are the same single-layer coating material with thicknesses $T_{M1}$ and $T_{M2}$ (which may be in the ranges discussed above). However, in other examples, they may differ. One particular example of the same coating is a silver coating where the silver-on-silver static coefficient of friction is greater than 1.0 at ambient conditions. As with the nickel coating, one or both of the silver coatings may be preceded by a copper strike/flash to provide a base layer.

Figure 4:
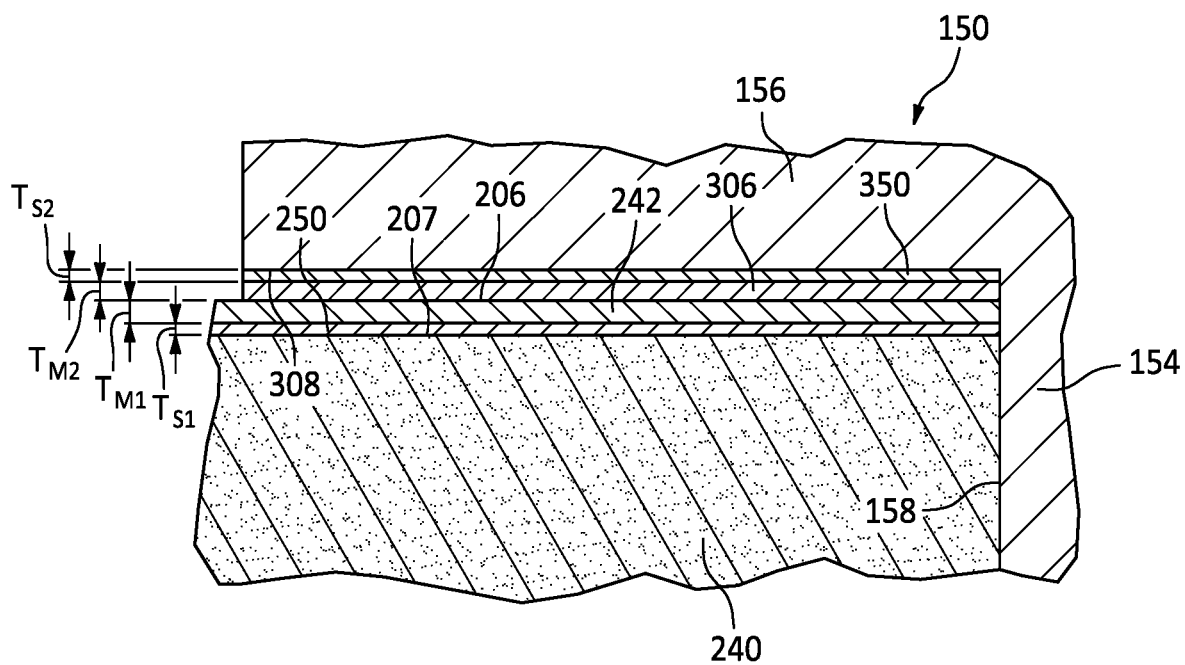
FIG. 4 is an enlarged axial sectional view of a fourth seal system.

As with the example nickel coatings, there may optionally be grinding post-spray. There may also be strike/flash layer(s) 250, 350 (FIG. 4 thicknesses $T_{S1}$ and $T_{S2}$) for one or both the seal coating and the carrier coatings.

Component materials and manufacture techniques and assembly techniques may be otherwise conventional. For example, there are numerous commercially available annular carbon seal blanks. Such a stock blank may be lathed to profile and may then have material milled and drilled away to reveal any non-annular features such as anti-rotation features (not shown). These commercial blanks are available in a variety of base carbon materials (e.g., carbon graphite and electrographite) with various impregnants (e.g., for strength/cohesion and/or lubricity) suitable for particular operating environments and conditions. Example material is at least 50% carbon by weight, more particularly, at least 90% or 95% or 99% or even commercially pure carbon with inevitable impurities.

Example seats may be machined from an appropriate metal alloy (e.g., a stainless steel). This may be via lathing of an annular blank to a basic profile and then milling and drilling departures from annular (e.g., mounting splines, ID oil channels, and the like if present).

The seal housing and seal carrier may be formed of an appropriate metal alloy (e.g., stainless steel or a titanium alloy) and may be formed such as by pure machining/drilling of a blank or by casting and finish machining.

In further variations (not shown), the single-layer or multi-layer coating(s) may extend along the faces 158 and/or 210.

FIG. 5 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A (forming the axis 500) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An apparatus comprising:
a first member;
a shaft rotatable relative to the first member about an axis; and
a seal system comprising:
a seal carrier having:
an axially-extending wall having an inner diameter (ID) surface; and
a radially-extending wall having a first surface;
a seal carried by the seal carrier in a radial interference fit with the seal carrier axially-extending wall ID surface and having:
an outer diameter (OD) surface; and
a seal face;
a seat carried by the shaft and having a seat face in sliding sealing engagement with the seal face; and
one or more springs biasing the seal carrier relative to the first member so as to bias the seal face against the seat face,
wherein:
the seal outer diameter (OD) surface is formed by a coating on a substrate of the seal; and
the coating has an outer friction layer and an inner strike layer wherein a largest by weight elemental component of the outer friction layer is different from a largest by weight elemental component of the inner layer.

2. The apparatus of claim 1 wherein:
the radial interference fit provides a compressive stress in the seal of 10 MPa to 150 MPa.

3. The apparatus of claim 1 wherein:
the coating increases a static coefficient of friction between the seal and the seal carrier.

4. The apparatus of claim 1 wherein:
the coating outer friction layer is metallic.

5. The apparatus of claim 4 wherein:
the coating outer friction layer comprises at least 30% by weight nickel.

6. The apparatus of claim 5 wherein:
the seal carrier inner diameter (ID) surface is formed by a steel or iron-nickel alloy body of the seal carrier.

7. The apparatus of claim 4 wherein:
the coating outer friction layer comprises at least 50% by weight silver.

8. The apparatus of claim 7 wherein:
the seal carrier inner diameter (ID) surface is formed by a steel or iron-nickel alloy body of the seal carrier.

9. The apparatus of claim 1 wherein:
the coating outer friction layer has a thickness of 2.5 micrometers to 200 micrometers.

10. The apparatus of claim 1 wherein:
the largest by weight elemental component of the outer friction layer is silver and the largest by weight elemental component of the inner strike layer is copper.

11. The apparatus of claim 1 wherein:
the largest by weight elemental component of the outer friction layer is nickel and the largest by weight elemental component of the inner strike layer is copper.

12. The apparatus of claim 1 wherein:
the seal carrier inner diameter (ID) surface is formed by a steel or iron-nickel alloy body of the seal carrier.

13. The apparatus of claim 1 wherein:
the seal carrier inner diameter (ID) surface is formed by a coating on a substrate of the seal carrier.

14. The apparatus of claim 13 wherein:
the coating on the substrate of the seal carrier is a metal or an alloy of the same base as a base of a metal or an alloy forming the coating outer friction layer on the substrate of the seal.

15. The apparatus of claim 14 wherein the base of the coating outer friction layer on the seal substrate and the base of the coating on the seal carrier substrate are both silver.

16. The apparatus of claim 1 wherein:
the seal is a carbon seal.

17. The apparatus of claim 1 wherein:
the seal substrate is a single piece.

18. The apparatus of claim 1 being a gas turbine engine.

19. A method for manufacturing the apparatus of claim 1, the method comprising:
applying the coating to the substrate; and
thermal interference fitting the seal to the carrier,
wherein:
the applying comprises plasma spray;
the thermal interference fitting comprises:
heating the seal carrier to a temperature of 90° C. to 250° C.;
inserting the seal into the heated seal carrier; and
cooling of the seal carrier to leave a radial interference fit with a compressive stress in the seal of 10 MPa to 150 MPa.

20. An apparatus comprising:
a first member;
a shaft rotatable relative to the first member about an axis; and
a seal system comprising:
a seal carrier having:
an axially-extending wall having an inner diameter (ID) surface; and
a radially-extending wall having a first surface;
a seal carried by the seal carrier in a radial interference fit with the seal carrier axially-extending wall ID surface and having:
an outer diameter (OD) surface; and
a seal face;
a seat carried by the shaft and having a seat face in sliding sealing engagement with the seal face;
one or more springs biasing the seal carrier relative to the first member so as to bias the seal face against the seat face; and
means comprising a coating for increasing a static coefficient of friction between the seal and the seal carrier.

21. A method for manufacturing an apparatus, the apparatus comprising:

a first member;
a shaft rotatable relative to the first member about an axis; and
a seal system comprising:
  a seal carrier having:
    an axially-extending wall having an inner diameter (ID) surface; and
    a radially-extending wall having a first surface;
  a seal carried by the seal carrier in a radial interference fit with the seal carrier axially-extending wall ID surface and having:
    an outer diameter (OD) surface; and
    a seal face;
  a seat carried by the shaft and having a seat face in sliding sealing engagement with the seal face; and
  one or more springs biasing the seal carrier relative to the first member so as to bias the seal face against the seat face, wherein:
  the seal outer diameter (OD) surface is formed by a coating on a substrate of the seal, the method comprising:
  applying the coating to the substrate; and
  thermal interference fitting the seal to the carrier.

22. The method of claim 21, wherein:
  the applying comprises plasma spray; and
  the thermal interference fitting comprises:
    heating the seal carrier to a temperature of 90° C. to 250° C.;
    inserting the seal into the heated seal carrier; and
    cooling of the seal carrier to leave said radial interference fit with a compressive stress in the seal of 10 MPa to 150 MPa.

* * * * *